July 21, 1964 H. HEINS ETAL 3,141,973
THERMOLUMINESCENT DOSIMETER
Filed Sept. 11, 1962
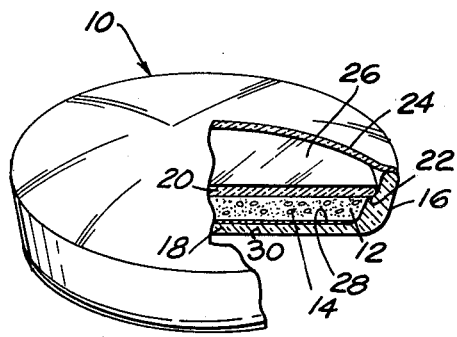
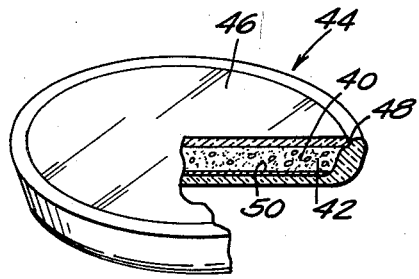
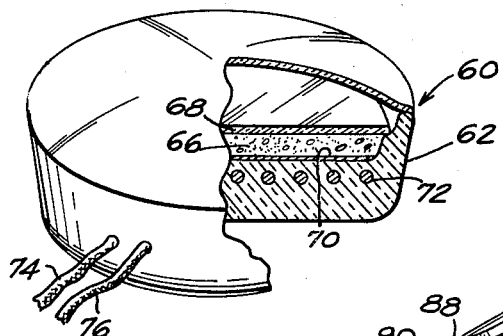
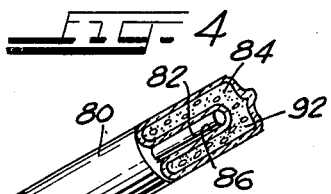
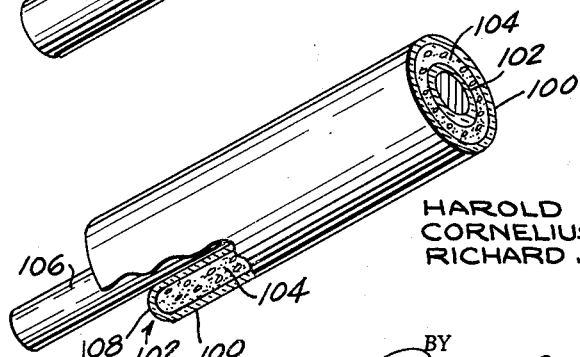
HAROLD HEINS
CORNELIUS J. BUCKLEY
RICHARD J. BRODERICK
INVENTORS July 21, 1964    H. HEINS ETAL    3,141,973
THERMOLUMINESCENT DOSIMETER
Filed Sept. 11, 1962    2 Sheets-Sheet 2
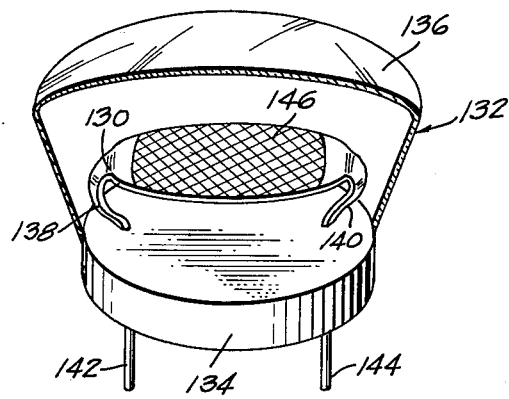
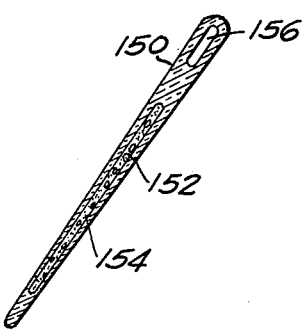
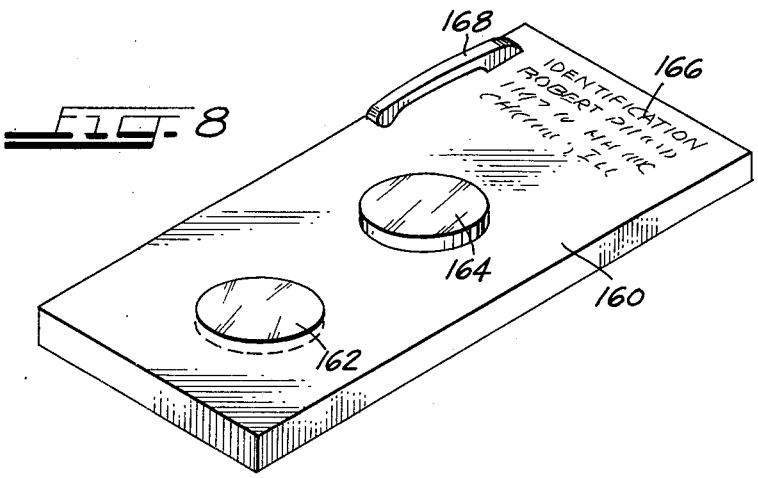
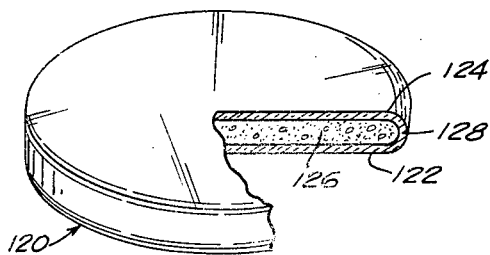
HAROLD HEINS
CORNELIUS J. BUCKLEY
RICHARD J. BRODERICK
INVENTORS
BY
Robert L. Slater, Jr.

United States Patent Office 3,141,973
Patented July 21, 1964

3,141,973
THERMOLUMINESCENT DOSIMETER
Harold Heins, Marblehead, Cornelius J. Buckley, Salem, and Richard J. Broderick, Beverly, Mass., assignors to Metcom, Inc., Salem, Mass., a corporation of Delaware
Filed Sept. 11, 1962, Ser. No. 222,974
17 Claims. (Cl. 250—71)

The present invention relates to apparatus for measuring ionizing radiation. More particularly, the present invention relates to an improved thermoluminescent dosimeter and the methods of preparing the component materials and construction of the improved dosimeter.

Exposure to ionizing radiation, such as X-ray, gamma ray, cosmic rays, and nuclear radiation generally, is an increasingly serious hazard to human beings. Medical and dental practitioners expose their patients and themselves to X-ray and gamma ray radiation in performance of a variety of diagnostic and therapeutic procedures; nuclear fission atomic power plants, both stationary and mobile, give rise to biologically harmful radiations during operation, and produce as by-products intensely radioactive materials which must be handled, processed, stored and transported. Concentrated radioactive isotopes are finding increasing uses in industry and in research laboratories; military nuclear weapons, upon detonation, disperse immense quantities of radioactive material into the atmosphere, which falls on populated centers and which is concentrated by natural processes; space and near-space exploration requires that manned vehicles pass through regions of locally intense ionizing radiation and expose the vehicles and their occupants to cosmic radiation generally. To avoid excessive dosage, persons exposed to biologically harmful radiation from any source must monitor the total radiation which their bodies receive. In addition to personnel radiation monitoring, there are numerous requirements for monitoring radiation from inanimate objects with high reliability.

Ionizing radiation has been measured by means of a variety of instruments, such as ionization chambers, Geiger counters, scintillation detectors, and others, all of which require power to operate and all of which have been found to be limited in many respects for personnel radiation monitoring. Passive or non-powered dosimeters which integrate or sum the total incident radiation have proven most useful for personnel monitoring; the small, pocket-sized electroscope and the photographic film badge have been, in recent times, in the most widespread use.

The photographic film badge dosimeter requires considerable processing after exposure to radiation to develop the film and translate the film exposure into units of radiation dosage. The film badge dosimeter must be reloaded with fresh unexposed film before it can be reused. Photographic film dosimeters are reliable through the dosage range in which they are sensitive, but lack as wide a dosage range as is desirable, lack close tolerance and quantitative reproducibility, and require entirely too complicated processing for readout to be practical in field or disaster environments.

The electroscope has been adapted to a pocket-sized, easily read dosimeter. These small electroscopes may be readily charged and calibrated under field conditions and they are conveniently read visually. Inherent in the electroscope structure is sensitivity to mechanical shock and rough handling. The electroscope, in response to mechanical shock, may lose its calibration; therefore, its reliability is never as complete as desirable. The electroscope has the advantage of not requiring complex processes for readout and reloading prior to reuse but may be read out visually and recalibrated by very simple means.

There remains the need for a highly reliable radiation dosimeter which may be utilized over and over again without additional reloading, complex processing, or calibration. Such a dosimeter preferably will have a very high reliability under the most severe field conditions or disaster environments.

The phenomenon of thermoluminescence has been known for many years and numerous previous efforts to adopt thermoluminescence to personnel radiation dosimetry have been undertaken, but without practical success. Thermoluminescence is the phenomenon observed in a number of materials, some of which occur naturally, in which ionizing radiation causes an entrapment of electrons within a crystal structure which are released with emission of visible light from the trapped condition when the thermoluminescent material is heated after exposure to the ionizing radiation.

Thermoluminescent materials may be prepared which exhibit good reproducibility in their response to radiation dosage. The thermoluminescent material may be exposed repeatedly, even hundreds of times, to radiation, each radiation exposure being quantitatively impressed upon the material and quantitatively read out upon heating between each exposure. Despite the extensive reuse of particular samples of thermoluminescent materials, their response to ionizing radiation remains unchanged.

The plot of luminescent brightness versus temperature at a constant heat rate is called the "glow curve." The number of peaks and the peak temperature are determined respectively by the number of different types of traps in the material and by the trap depth, that is, the energy with which an electron is bound in the trap. With shallow traps moderate ambient temperatures will release the trapped electrons and visible photons. The deeper the trap, the higher the glow peak temperature, and the more stable the phosphor is at ambient temperatures. The thermoluminescent brightness for a given exposure depends on the concentration of trapping sites and on the efficiency of the recombination process. The rate of heating the phosphor also affects the glow curve, although the total light emitted is the same, regardless of heating rate. Faster heating gives narrower glow curves of higher peak brightness and shifts the peak emission to higher temperatures.

When used as a dosimeter, the thermoluminescent material is observed by a light sensitive apparatus during the heating process and the entire glow curve, or peak brightness, is observed. Either the area under the glow curve or the brightness of emitted light at the glow peak may be used as a measure of dosage. Thermoluminescent material is restored to its original unirradiated condition by the application of heat during the readout process, which releases all the trapped electrons and thereby is prepared to register new radiation exposure upon cooling. Thermoluminescent materials adaptable to dosimetry must have deep electron traps from which electrons and visible photons are not emitted at normal ambient temperatures. Any appreciable number of shallow and intermediate depth traps which are depopulated at ambient and moderately elevated temperatures with the passage of time will reduce the usefulness of the thermoluminescent phosphor material for dosimetry.

Earlier endeavors to construct practical personnel radiation dosimeters with thermoluminescent phosphor materials were not successful due to the fact that the earlier thermoluminescent materials were insensitive to low dosage rates, or were sensitive to small radiation dosages but were unstable and released trapped electrons spontaneously at ambient temperatures with the passage of time. Continued efforts to develop suitable dosimetry thermoluminescent materials resulted in the production of manganese-activated calcium fluoride, which contained almost exclusively deep traps. One serious disadvantage of the deep electron trap phosphor material was its sensitivity to mechanical friction and its chemical reactivity with its environment. Other deep-trap thermoluminescent materials have been found in nature in limited quantities and have been manufactured subsequent to the first success with manganese-activated calcium fluoride. These other phosphor materials include lithium fluoride, calcium sulphate, and some organic materials. All of these materials were subject to spurious luminescene as a result of mechanical friction or triboluminescence of the phosphor and interaction with various elements in the environment of the phosphor. Low level intensity dosage rates could not be registered by the earlier thermoluminescent dosimeters because of the foregoing shortcomings. As much as 300 milliroentgen (mr.) equivalent radiation dose would be registered by these early thermoluminescent dosimeters in response to rough handling; accordingly, their reliability and usefulness were inadequate for practical application.

Various schemes were employed to avoid the spurious luminescence in these early thermoluminescent materials so that they could be utilized in practical dosimeters. One device utilized only the glow peak or "threshold" of a thermoluminescent material confined within a glass container. No effort to read quantitatively the total radiation was made in this dosimeter but the range of radiation was estimated by including a plurality of different thermoluminescent materials which presumably would have different radiation dosage "thresholds" or glow peaks. This device did not prove to be a practical dosimeter because of its insensitivity and because the glow peak or "threshold" of the different thermoluminescent materials was affected by chemical reaction with the environment of the phosphor and by spurious luminescence induced by its previous handling.

A later endeavor to provide a practical personnel dosimeter utilizing thermoluminescent materials was undertaken with superior deep-trap thermoluminescent materials which were imbedded in a transparent screen in an endeavor to reduce the spurious effects due to internal mechanical friction resulting from handling the material. Closely related to this effort were dosimeters prepared by mixing thermoluminescent powder with temperature resistant transparent cementing materials, the mixture of which would then be coated onto heating elements encased within a glass tube. Dosimeters constructed in this manner gave reliable readings as low as 50 mr. radiation dosage and greatly, but not completely, reduced the spurious luminescent effects. One difficulty encountered by these latter two techniques of mounting the phosphor was that the readout process for deep-trap phosphors requires heating the thermoluminescent material to temperatures between 250 and 400 degrees C.; repeated cycling at these temperatures caused scaling and breaking up of the thermoluminescent coatings and supporting structures. Accordingly, a practical, sensitive, mechanically rugged dosimeter was not provided by any of these schemes.

Deep-trap thermoluminescent materials, sensitive to radiation in the milliroentgen range, may be prepared in the laboratory. These materials have a further advantage of being linear in their response to radiation through as much as seven decades of radiation dosage. The desirability of adapting thermoluminescent materials to personnel radiation dosimeters is clear. There remains the practical problem of providing a thermoluminescent dosimeter which is sensitive to very small radiation dosage, which is mechanically rugged, which is free of spurious luminescence, which may be used over and over after repeated readout, and which will be inexpensive to manufacture.

Accordingly, one object of this invention is to provide an improved thermoluminescent radiation dosimeter.

Another object of this invention is to provide an improved means for mounting thermoluminescent materials in a radiation dosimeter.

Another object of this invention is to provide a novel means for adopting thermoluminescent materials to a variety of dosimetry devices.

Still another object of this invention is to provide an inexpensive, sensitive, and reliable thermoluminescent dosimeter which may be accurately reproduced in great quantity.

Another object of this invention is to provide a method of preparing the component parts of an accurate and reliable thermoluminescent radiation dosimeter.

These and other objects and advantages of our invention will be evident from the following drawings, specification and claims.

Our invention is more easily described in view of the following illustrations:

FIGURE 1 is a partly cut-away perspective view of a preferred embodiment of our invention.

FIGURE 2 is a partly cut-away perspective view of a second preferred embodiment of our invention.

FIGURE 3 is a partly cut-away perspective view of another embodiment of our invention.

FIGURE 4 is a partly cut-away perspective view of still another preferred embodiment of our invention.

FIGURE 5 is a fragmentary perspective view of another embodiment of our invention.

FIGURE 6 is a partly cut-away perspective view of another preferred variation of our invention.

FIGURE 7 is a partly cut-away perspective view of an embodiment of our invention for specialized medical science use.

FIGURE 8 is a perspective view of a typical personnel dosimeter in which thermoluminescent materials contained within embodiments of our invention, as illustrated in FIGURE 1, have been incorporated.

FIGURE 9 is a partly cut-away perspective view of another species of our invention.

Referring now to FIGURE 1, which illustrates a preferred embodiment of our dosimeter, a plaque or shallow container 10 is formed of transparent glass, preferably of the borosilicate temperature resistant variety referred to in the literature and below in this specification as "Pyrex" glass. The plaque 10, viewed from the exterior, is substantially a flat circular disk, convenient dimensions being one to three centimeters in diameter and one-quarter to three-quarters centimeters thick. Thermoluminescent phosphor 12, which is more fully described below, is sealed within a shallow recess 14 provided in the interior of the plaque. The shall recess 14 is symmetrical, as shown in the illustration, with the exterior circular contour of the plaque. The phosphor contained within the recess is confined by the side walls 16 of the plaque, the bottom wall 18 of the plaque, and a partition disk 20 which is sealed about its periphery to the interior of the side walls 16. A recessed contour 22 is provided on the side wall interior for seating the partition disk 20. This partition disk 20 may be made of Pyrex glass also. A circular cover 24 of transparent glass is sealed about its periphery to the uppermost part of the side walls 16. The cover 24 is positioned a spaced distance from the partition disk 20, as may be readily seen in the illustration; the space between the partition disk and cover forms a closed plenum or chamber 26 immediately beneath the cover. The thickness of the phosphor layer 12 may vary from 0.2 millimeters to 5 millimeters and the depth of the plenum chamber at the center may be from 1.0 to 5.0 millimeters.

In FIGURE 1 the embodiment of our invention is shown with a thin film of reflective metal 28 applied to the interior surface of the bottom wall 18 of the plaque. Platinum or gold, evaporated or applied by other means onto the interior surface of the bottom wall 18, has proven useful as a mirror or light-reflecting surface. In addition to platinum or gold, numerous other chemically stable, reflective metals, such as tantalum, columbium, titanium, zirconium, and others, will suffice for the reflective metal film 28 which may vary from a few molecules in thickness to a millimeter or more. The reflective metal film we have found to be a useful feature of our invention, but not a necessary feature. The plaque shown in FIGURE 1 may be prepared without this metal film 28, and in the absence of the reflective film will serve in a satisfactory manner.

The lowermost exterior surface 30 of the plaque 10 is ground and polished. The bottom wall 18, after grinding, may be between one-half and five millimeters in thickness. The grinding and polishing of the lower surface makes a more efficient heat transfer to the phosphor during the readout process.

The plenum chamber 26 is evacuated to a low pressure, $10^{-2}$ mm. Hg being a suitable average pressure. The vacuum within the chamber 26 has the purpose of reducing the heat transfer through the cover 24 of the plaque during the readout process. There is an advantage, as indicated above, in heating the phosphor for readout quickly and evenly; the more sharply peaked glow curve, which is more convenient to detect quantitatively, is obtained. Hence, one surface of the plaque 10 is prepared to conduct heat evenly and quickly into the phosphor while the remaining surfaces of the plaque are designed to impede the loss of heat through radiation or conduction.

The phosphor 12 is sealed within the recess 14 in an inert environment. Vacuum of $10^{-4}$ mm. Hg has been successfully employed; however, an easier, less costly scheme than sealing in a vacuum environment is to seal the phosphor in an inert gas such as helium, argon, or other noble gas. We prefer argon and have successfully utilized it at atmospheric pressure in the embodiment illustrated in FIGURE 1.

The phosphor 12 prepared, as will be described below, for mounting in the plaque is a loose unbound powder. The thermoluminescent effect of the phosphor is maximized by avoiding any contamination of the deep electron trap phosphor. Cement for binding the phosphor or adhering the phosphor to a surface reduces the luminescence and lessens the effectiveness of the unadulterated phosphor. On the other hand, the most sensitive radiation responsive deep electron trap thermoluminescent phosphors exhibit a large triboluminescent effect, that is, luminescence upon heating in response to previous mechanical disturbance or previous surface friction of the phosphor grains.

In order to maximize the desired thermoluminescent effect and suppress the spurious triboluminescent effect, we mount the phosphor 12 in the recess 14 under a mechanical loading which holds all the grains in position substantially free of internal mechanical friction during subsequent rough handling of the sealed plaque. The phosphor is prepared so that there are larger grains of the phosphor crystal, that is, .01 to .1 millimeter in diameter range; and, in addition, there is a very fine phosphor powder which does not exceed .001 mm. grain size. These two grain sizes of the phosphor, identical in their chemical composition and origin and differing only in grain size, are thoroughly mixed. A ratio by volume of one part larger grain size particles to two parts fine grain phosphor has been used successfully; however, a range of grain size ratios of between one to one, and one to ten, large grain to fine grain size respectively, has proved satisfactory. A portion of the phosphor is placed in the recess and gently shaken or tapped down until every interstice between the larger phosphor grains is fully packed with the fine grain phosphor. The densely-packed phosphor powder, under an argon atmosphere, is enclosed in the recess 14 by the partition wall 20. Mechanical pressure is applied to the partition and to the phosphor while the hermetical sealing process of the partition about its periphery to the side walls 16 is accomplished. The phosphor, as a result, is under a mechanical compressive load of one-tenth to ten kilograms per square centimeter in the sealed plaque. No space is left in the recess 14, which is not tightly packed with the mixture of larger and smaller phosphor grains in the finished plaque. Substantially no room is left for the phosphor grains to move with respect to one another within the completed plaque.

Naturally occurring calcium fluoride crystal samples exhibit thermoluminescence. The glow peak intensities and the temperature of the glow peak maximums vary from sample to sample. The depth of the electron traps in naturally occurring calcium fluoride crystal is randomly distributed. Shallow and intermediate depth electron traps spontaneously release the trapped electrons at ambient temperatures; therefore, the usefulness of naturally occurring calcium fluoride crystal for thermoluminescent dosimetry is severely limited. Numerous other naturally occurring materials, such as lithium fluoride, calcium sulfate, and to a slight extent some organic substances, exhibit thermoluminescent properties. However, all the naturally occurring materials in any significant size sample appear to have randomly distributed electron trap depths which preclude reliable register of low radiation dosage.

Preparation of phosphors generally and thermoluminescent phosphors specifically is described in the literature. These preparation procedures in the present state of the phosphor art are more technique than application of fundamental principle. For application in our dosimeter, any solid or liquid thermoluminescent phosphor is satisfactory which exhibits a substantial preponderance of deep electron traps and is chemically and physically stable at temperatures from ambient to a few tens of degrees centigrade above the glow curve maximum temperature.

The preparation process and properties of a deep electron trap thermoluminescent phosphor, which we have sucessfully applied to our dosimeter, is described below.

The phosphor must be prepared with utmost attention to cleanliness and avoidance of contamination of the final product.

We prepared pure calcium fluoride, a first ingredient of our phosphor, as follows:

Distilled $H_2O$ _____ml__ 500
Hydrofluoric acid, transistor grade _____ml__ 100
Calcium carbonate, SL grade _____gms__ 100

Mix the above ingredients slowly to permit escape of carbon dioxide gas. Add distilled water and decant at least three times. Filter and dry precipitate on a polyethylene tray in a 60° C. oven.

We prepare manganese fluoride, a second ingredient in our phosphor, as follows:

Manganese chloride ($MnCl_2 \cdot 4H_2O$, reagent
  grade) _____gms__ 75
Distilled $H_2O$ _____ml__ 100
Ammonium fluoride ($NH_4F$, reagent grade) __gms__ 30

Filter and dry precipitate in a 60° C. oven on a polyethylene tray.

Mix as dry powders with a mortar and pestle, preferably made of pit-free flint or its equivalent:

0.97 moles of the $CaF_2$ crystals
0.03 moles of the $MnF_2$ crystals

The ingredients must be analyzed for $CaF_2$ content and $MnF_2$ content, respectively, and the weights of the ingredients adjusted accordingly to obtain molar proportions.

The ground mixture of 0.97 m. $CaF_2$ and 0.03 m. $MnF_2$ is next sintered in a closed platinum crucible for eighteen hours at 1200° C.±5° C., removed from the furnace and cooled slowly. The cooled, sintered phosphor is next ground with mortar and pestle, screened, and the fine material ground in a ball mill until very fine.

Screenings of one part crystal phosphor from .01 to .1 millimeter size are finally mixed with two parts by volume of the very fine (.001 mill grain size and smaller) phosphor.

Phosphor prepared as above exhibits the following thermoluminescent characteristics after extensive exposure to gamma ray irradiation:

Glow peak temperature: 285° C.
Percentage of glow peak intensity of light emitted at:

100° C.=0.43%
150° C.=1.0%
200° C.=8.4%
285° C.=100.0%

An alternative phosphor preparation, the preparation process of which is described below, has been successfully utilized and has yielded deep electron trap thermoluminescent phosphor for satisfactory use in our dosimeter.

Carefully blend by mixing with mortar and pestle:

Calcium carbonate, reagent grade _____gms__ 10
Ammonium fluoride, reagent grade _____gms__ 7.5
Manganese carbonate, reagent grade _____gms__ 0.5

Place in a platinum crucible. Cover over the charge in the crucible with a shallow layer of two grams ammonium fluoride. Place the crucible with a cover within a cold muffle furnace. Heat the furnace steadily to 350° C., at which time argon gas purge is introduced into the furnace. Continue the heating to 775° C. After the crucible and its contents have attained an even temperature of 775° C., quickly increase the temperature of the furnace to 800° C., hold at the elevated temperature for five minutes, then remove the crucible containing the phosphor and cool in the air.

Phosphor prepared by the above-described method was gritty and less readily ground. The glow curve was characterized as follows:

Glow peak temperature: 275° C.
Percentage of glo peak intensity of light emitted at:

65° C.=0.48%
100° C.=0.38%
150° C.=0.86%
200° C.=13.0%
275° C.=100.0%

A negligible number of shallow and intermediate depth electron traps were found in the phosphor prepared according to the second described method.

While the two phosphors selected for detailed description of their methods of preparation and properties are both manganese-activated calcium fluoride, our invention is in no way restricted to the use of $CaF_2$:Mn phosphors, but contemplates utilizing any radiation sensitive deep electron trap thermoluminescent phosphor.

One variation we have found useful and alternative to the loading of phosphor in our dosimeter plaques comprises the mixture of one part phosphor grains in the range of .5 millimeter to 0.01 millimeter diameter with two parts by volume of exceedingly fine ground Pyrex glass powder. Other inert, temperature stable materials which are reasonably translucent in the finely ground state may also be utilized as a packing and supporting material for the phosphor grains in our dosimeters. Loading and sealing procedure of the plaques, when finely ground inert nonphosphor packing material is mixed with the phosphor grains, is identical to that procedure described above.

Readout of a dosimeter prepared in accordance with the above specification of the embodiment of our invention illustrated in FIGURE 1 is accomplished by placing the irradiated plaque on a heat source and beneath a quantitative visible light detector such as a photomultiplier tube with suitable output current indicator or recorder. The irradiated dosimeter plaque is positioned on the heat source so that heat flows evenly through the bottom wall 18 into the phosphor. The glow curve of the phosphor which is described above in connection with the first phosphor preparation emits detectable quantities of light at approximately 60° C.; the glow peak intensity is reached when the phosphor within the plaque is heated to 285° C. All the trapped electrons are released from the phosphor by the time the phosphor is heated to 400° C. The heating rate of the phosphor during readout affects the glow curve. The total light emitted is the same whether the heating is fast or slow, but rapid heating produces a sharper peaked curve with a maximum at a slightly higher temperature.

The radiation dose measured in roentgens is linear with respect to total light emitted by the phosphor during heating through the temperature range of the glow curve. The relationships between radiation dosage and light emission for thermoluminescent materials are discussed in the literature. One such reference is Schulman et al., Review of Scientific Instruments, December 1960, page 1263. Once the slope of the curve for the linear relation between the radiation dosage and the luminescence is established for a particular phosphor, the integral of the photomultiplier output current may be calibrated in roentgens.

Numerous variations in the physical arrangements of our invention have proven useful for specialized purposes. A second preferred embodiment of our invention is illustrated in FIGURE 2. A quantity of thermoluminescent phosphor 40, which is a mixture of larger and very fine grain sizes, mechanically packed to prevent motion with respect to the particles, is positioned within a recess 42 formed by a concave disk 444 and a cover 46 which may be hermetically sealed about the perimeter 48 of the disk. A very thin reflective metal coating 50 is applied to the lower interior surface of the concave disk. The metal film 50 reflects light emitted by the phosphor 40 back through the phosphor. The disk 44 and the cover 46 attached thereto may be any transparent or translucent temperature-resistant material with which the phosphor will not react chemically. The embodiment of our invention, illustrated in FIGURE 2, is in most respects similar to that illustrated in FIGURE 1, excepting there is no plenum or evacuated chamber over the cover. The advantage of a very flat dosimeter, such as illustrated in FIGURE 2, is mainly one of smaller dimension.

FIGURE 3 illustrates still another variation of our dosimeter similar to that shown in FIGURE 1, excepting that the embodiment of FIGURE 3 is provided with an internal resistance heating means. A plaque 60, comprised of a concave disk 62, contains a shallow layer of phosphor 64 tightly packed within a concave recess 66 provided within the plaque. The phosphor is prepared and mechanically packed as the phosphor described in connection with FIGURE 1. A cover 68 is sealed in contact with the phosphor 64. A reflective metal film 70 is applied to the interior surface of the disk beneath the phosphor, as shown in the illustration. Inclusion of the reflective metal film behind the phosphor is an optional feature which contributes to the efficient readout of our dosimeter, but is not critical to proper operation of our dosimeter. A resistive heating element 72, the two terminals of which 74 and 76 are shown in the illustration, is embedded within the base of the disk 62 immediately below the reflective metal film 70. A convenient geometrical arrangement for the resistive heating element 72 is a spiral.

The embodiment of our invention shown in FIGURE 3 is very similar in all of its characteristics to that shown in FIGURE 1, described above, excepting for readout procedure. A heat source is contained within the individual dosimeter plaque, and heat during the readout process is applied quite directly to the region of the plaque containing the phosphor. By such an arrangement, the entire plaque and the readout apparatus is not exposed to as large an amount of thermal energy as is required for the readout of a plaque such as shown in the embodiments of FIGURES 1 and 2.

FIGURE 4 illustrates still another preferred embodiment of our thermoluminescent dosimeter. A cylindrical mounting base 80, which may be made of aluminum, magnesium or heavier metal, such as iron or brass, is provided with a reduced coaxially cylindrical extension 82 protruding from a first end thereof. A folded cylinder 84 prepared from glass, such as Pyrex glass, is shaped to have an external diameter similar to that of the mounting cylinder 80 and is further provided with a concave recess 86, into which the cylindrical extension 82 is inserted and substantially completely occupies, such as is shown in the drawings. The mounting cylinder 80 may be inserted into a plastic holder 88 on which a pocket clip 90 has been attached. Thermoluminescent phosphor 92, prepared in accordance with the specification for preparing and packing deep-trap electron thermoluminescent phosphor in connection with the embodiment of our invention, illustrated in FIGURE 1, is tightly packed into the interior of the folded cylinder 84. The folded cylinder 84 may be made from a Pyrex glass rod where one end of the rod, heated to a plastic condition, is closed off and then shaped, as shown in FIGURE 4, to contain a deep concave cylindrical recess 86 having the same dimensions as the exterior surfaces of the cylindrical extension 82. The second or upper end of the glass rod may be left open until the phosphor mix has been placed in the interior of the folded cylinder and tamped into place so that there are no interstices where the phosphor grains may move about and give rise to spurious triboluminescent effects. The phosphor is sealed under an inert atmosphere, preferably one or a mixture of the noble gases, and the second or upper end of the folded cylinder tube is sealed off. The geometrical distribution of the phosphor contained within the folded cylinder is such that the radiation incident upon the phosphor from any plane will intercept the phosphor layer and the radiation will, accordingly, be registered. By utilizing a three-dimensional structure in which to encase the thermoluminescent phosphor, shadow effects, that is, a variation of the total radiation registered in response to the position of the dosimeter with respect to the radiation source, may be avoided.

Readout of the dosimeter embodiment, illustrated in FIGURE 4, is readily accomplished by removing the mounting cylinder 80 from the cylindrical plastic holder 88, positioning the mounting cylinder 80 in thermal conducting contact with a suitable heat source, such that the requisite amount of heat for accomplishing the readout of the irradiated phosphor in the dosimeter may be conducted from the heat source through the mounting cylinder 80, through the cylindrical extension 82 and into the phosphor 92. The readout photosensitive equipment must be adapted to receive the light which will emanate from the folded cylinder; this is accomplished by positioning reflecting surfaces which focus the light coming through the side walls of the folded cylinder 84 upon the sensitive element of the photomultiplier tube. A reflective metal film coated on the surface of the folded cylinder beneath the phosphor and adjacent to the recess 86 may be used, although not shown in FIGURE 4, to increase the light falling on the readout light detector.

There are numerous requirements for dosimeters to be mounted within or near sensitive instruments where a record of the radiation falling on the instrument is desired. FIGURE 5 illustrates an embodiment of our invention adapted for use in either a personnel dosimeter or for use in connection with other radiation monitoring requirements. Two coaxial cylindrical tubes 100 and 102 are mounted in spaced relationship, such that thermoluminescent phosphor 104 may be evenly loaded between the two tubes 100 and 102. A cylindrical rod 106, inserted within the inner tube 102, may be used as a mounting for the dosimeter structure during exposure to radiation, and during the readout process. The space between the tubes 100 and 102 may be sealed off at either end, as is shown in the cut-away view of FIGURE 5 at 108.

The phosphor mounted within the tube 100 may be exposed to radiation and then conveniently read out by applying heat to the rod 106. The mounting rod 106 may be a metal, such as iron, in which heat may be induced by high frequency induction heating. The advantage of the embodiment illustrated in FIGURE 5 is that minimal shadow effects are encountered from radiation in any plane and the overall dimensions of the dosimeter may be kept extremely small.

Still another useful variation in the structure of our dosimeter is illustrated in FIGURE 6. A thin circular Pyrex glass or other temperature resistant and chemically inactive glass plaque 120 is prepared by heating two plane glass disks 122 and 124 until they are plastic, particularly about their respective peripheries. A quantity of granular phosphor 126 is placed on one of the glass disks 122, in an inert atmosphere, and the second disk 124 is then placed over the phosphor 126. The periphery 128 of the two disks is then heat-sealed by gentle pressure and increased heat. Care is taken during the sealing process to avoid leaving any space between the circular disks 122 and 124 which is not tightly packed with solid granular phosphor. When the plaque has cooled, the plane exterior surfaces of each side of the plaque may be polished to improve their light transmission and made smooth to improve conductive heat transfer into the phosphor. The phosphor material may be prepared as a mixture of coarse grain and fine grain deep electron trap thermoluminescent phosphor, in accordance with that described above. Similarly, the phosphor may be prepared as a mixture of coarse phosphor grains and finely powdered inert material.

The advantage of the embodiment of our invention illustrated in FIGURE 6 is the very low cost of such a structure. The relatively simple techniques available for preparing plaques of this embodiment contribute to the low cost and also make possible the forming, filling and sealing of the plaques by inexpensive machine operations.

Still another very useful embodiment of our invention which finds special application in medical science is illustrated in FIGURE 7, in which a Pyrex glass needle 150 contains a hollow cylindrical recess 152 into which thermoluminescent phosphor 154 has been packed in accordance with the principles of our invention, and sealed. The phosphor is prepared in accordance with the description above to include a mixture of particle sizes so that upon being tamped and mechanically compressed into the recess, the phosphor sealed within the recess is securely bound mechanically and will not give rise to spurious luminescent effects. The embodiment shown in FIGURE 7 is a needle which may be sutured within tissues of a living animal or person. The dosimeter needle 150 is provided with an eye 156 through which the needle may be secured in place; the needle is sufficiently slender so that it may be inserted in a very small incision. Such a dosimeter finds use in both diagnostic and therapeutic procedures where it is desirable to have a quantitative record of the amount of radiation falling upon particular tissues of a living animal or person. After the dosimeter needle has been irradiated, it may be withdrawn from the tissue and read out by heating in the manner described above in connection with other embodiments of our invention. For medical research, structures of numerous other geometries, in addition to the needle illustrated, may be utilized.

A completed typical dosimeter for personnel radiation monitoring is illustrated in FIGURE 8. A badge 160, approximately 3 x 5 inches or smaller, and approximately one-eighth inch thick, is adapted to securely hold two disk-shaped thermoluminescent dosimeter plaques 162 and 164. The plaques are preferably separated a spaced distance on the badge. Means for identifying the badge 160 is provided. The badge material may be formed conveniently from a temperature-resistant plastic or metal, such as aluminum or magnesium alloy. Identification means may be permanent, such as an identifying number or name 166 stamped or molded into the badge, or it may be a label which from time to time can be replaced. A clip 168 is provided on the badge for holding it securely on the wearer's apparel.

Readout of a personnel radiation monitoring dosimeter, such as illustrated in FIGURE 8, may be accomplished by removing the dosimeter plaques 162 and 164 and processing them in accordance with the readout procedure described in connection with the embodiment shown in FIGURE 1; readout of the irradiated plaques while still mounted within the badges is also feasible. In some personnel monitoring procedures it is desirable to have a daily or even an hourly readout of the personnel dosimeter and simultaneously maintain a longer period dosimeter readout schedule with a second dosimeter. Accordingly, the inclusion of two or even more separate dosimeter plaques, within a badge assembly such as shown in FIGURE 8, is particularly well adapted to such monitoring procedures.

Referring now to FIGURE 9, which illustrates still another species of our invention, a metallic, electrically conductive substrate 130 is mounted within a glass tube 132. The tube 132 is comprised of a tube base 134, which may be ceramic or temperature-resistant polymer, and a shallow transparent glass envelope 136 sealed by conventional means to the tube base 134, as shown in the illustration. An inert environment is provided within the envelope by evacuating the tube before sealing or by sealing a noble gas within the tube. The substrate 130 is a thin, flat metal sheet, substantially elliptical in contour, with narrowed extensions 138 and 140 projecting from the principal axis of the ellipse. The extensions 138 and 140, in the particular embodiment shown, are thicker than the substrate and adapted to carry electrical current with less resistance and, therefore, less heating than the thin elliptical substrate. The extensions 138 and 140 are curved downward and beneath the substrate, as shown in FIGURE 9, and are both mounting means and electrical leads for the substrate. The extensions 138 and 140 are electrically connected to conductive tube socket pins 142 and 144.

A film of colloidal particles of thermoluminescent phosphor 146 are deposited on the surface of the substrate immediately beneath the glass envelope. The colloidal particle film is deposited on the substrate cataphoretically. The film may be from .01 mm. to 0.5 mm. in thickness, and by suitable masking of the substrate 130 and the extensions 138 and 140 thereof, confined to one restricted surface of the substrate 130, as shown in the drawing. The cataphoretically deposited film is comprised of discrete colloidal particles tightly bonded to the substrate by adsorption of the charged colloidal particles onto the metal. In this condition, the particles of the thermoluminescent phophor are rigidly held mechanically to the substrate free of surface friction resulting from rough handling. Accordingly, the cataphoretically deposited phosphor film will not be subject to spurious triboluminescence.

Cataphoretic deposition of colloidal particles on a metal base has long been known and described in the literature. To deposit a film of phosphor on the subtrate, a colloidal solution in water of the phosphor is prepared. Depending upon the composition of the phosphor, the pH of the solution is adjusted to maximize the colloidal particle concentration in the solution. A current is passed through the solution, the substrate upon which the colloidal film is to be deposited being one of the electrodes. The migration of charged colloidal particles in an electrical field is termed electrophoresis; deposition of the colloidal particles on the cathode is termed cataphoretic deposition.

A thermoluminescent phosphor, prepared such as one of those described above, is finely ground and placed in a solution in sufficient concentration to form a dense colloidal suspension. A D.C. source passes current into the solution from an anode, the substrate is inserted into the solution, and when electrically grounded becomes a cathode. Thickness of the film deposited may be regulated by the current density and the time of exposure of the substrate within the solution.

Operation of the dosimeter, illustrated in FIGURE 9, is similar in all respects to that of the species shown in other figures. The phosphor, upon being irradiated, traps electrons which, when the phosphor is heated, releases the trapped electrons and photons of visible light, the glow curve during the heating process being quantitatively related to the total irradiation.

In order to read out the dosimeter after irradiation, a current is passed through the substrate which gently heats the phosphor to a temperature which releases the trapped electrons. Measurement of the accompanying visible emission is accomplished as described above in connection with other species of our invention.

The foregoing specification and drawings are merely illustrative of preferred embodiments of our invention, the scope of which is described in the following claims.

We claim:

1. An improved radiation dosimeter comprising a quantity of thermoluminescent phosphor powder and a container having a transparent wall, the phosphor powder being compressed and sealed within the container in an inert environment, whereby the phosphor powder is restrained from all internal motion relative to the container walls, therewith eliminating triboluminescence of the phosphor.

2. An improved thermoluminescent phosphor radiation dosimeter comprising a transparent temperature resistant container, granular thermoluminescent phosphor, the phosphor being compressed and sealed within the container in an inert environment, whereby the phosphor grains are held motionless with respect to one another and without contamination within an inert environment.

3. An improved dosimeter comprising a thermoluminescent phosphor powder having a preponderance of deep electron traps and a container having a transparent wall, the phosphor powder being tightly packed and sealed within the container in an inert environment.

4. An improved dosimeter comprising thermoluminescent phosphor granules having a preponderance of deep electron traps and a glass container having a transparent wall, the phosphor granules being packed tightly within the sealed container in an argon atmosphere, whereby the phosphor granules are held immobile with respect to internal movement, uncontaminated, and in an inert atmosphere.

5. An improved radiation dosimeter plaque comprising thermoluminescent phosphor having a preponderance of deep electron traps, the phosphor being a plurality of granules, a recessed container having on a first side a transparent wall and having a second wall opposite the transparent wall, and a reflecting metal film adhered to the interior surface of the second wall, the phosphor granules being tightly packed and sealed within the container in an argon atmosphere; whereby the phosphor granules may be observed upon heating to emit visible light in proportion to previous atomic irradiation, and are held firmly, free of relative motion, within the plaque.

6. An improved radiation dosimeter plaque comprising a thermoluminescent phosphor having a preponderance of deep electron traps, the phosphor being comprised of granules larger than .01 mm. mixed with very fine grain phosphor powder comprised of grains less than .001 mm. in diameter and the plaque being in part transparent and having a hollow sealable recess, a quantity of argon gas, the phosphor mixture being packed tightly and sealed in the argon gas within the plaque recess, and the phosphor granules and grains being held in an inert environment rigidly with respect to one another; whereby the phosphor upon being heated may be observed to emit visible light in proportion to previous atomic irradiation.

7. The thermoluminescent phosphor of claim 6 being manganese-activated calcium fluoride.

8. An improved radiation dosimeter plaque comprising a thermoluminescent phosphor having a large preponderance of deep electron traps, the phosphor being granulated and the plaque being in part transparent and having a hollow closed recess, a quantity of noble gas, and a quantity of fine grain powdered inert material, the phosphor granules being mixed with the inert material, the mixture being tightly packed and sealed with the noble gas within the plaque recess, and the granules being rigidly held in an inert environment, without movement with respect to one another; whereby upon being heated visible light is emitted by the phosphor in direct proportion to previous irradiation of the dosimeter plaque.

9. The dosimeter plaque of claim 8 being comprised of a glass circular disk having a first side and a second side, the first side being recessed, and a circular transparent glass wall adapted to fit over the recess and seal to the periphery of the disk, the second side of the disk being ground and polished on the exterior thereof and the interior surface of the recess within the disk having a reflective metal film thereon.

10. An improved radiation dosimeter comprising in combination a thermoluminescent phosphor having a large preponderance of deep electron traps, the phosphor being a mixture of various size granules; a dosimeter plaque comprising a circular disk having a first side and a second side, the first side of the disk being recessed, a reflective metal film coating the first side of the disk, the second side of the disk being ground smooth and polished, and the phosphor being tightly packed within the recess; a first plane transparent cover applied to the first side of the disk and sealed about the periphery thereof to the periphery of the disk, the phosphor being enclosed within the recess and beneath the cover; and a second circular cover mounted a spaced distance from the first cover and sealed about the periphery thereof to the periphery of the disk, therewith forming a sealed chamber between the first and second cover; whereby upon applying heat to the phosphor through the second side of the disk, visible light is emitted in proportion to the previous irradiation of the dosimeter, and heat flow by conduction out of the phosphor through the two covers on the disk is impeded by the chamber.

11. The phosphor within the recess of the dosimeter plaque disk of claim 10 being sealed in an argon atmosphere, and the chamber between the first and second cover being evacuated.

12. The phosphor of claim 11 being a mixture of various sized granules of crystalline calcium fluoride activated with 0.03 mole manganese per mole of phosphor.

13. An improved radiation dosimeter comprising in combination a cylindrical transparent container, a mixture of various size granules of thermoluminescent phosphor having a large preponderance of deep electron traps, the phosphor granules being tightly packed within the cylindrical container, and a quantity of chemically inert gas, the phosphor granules and inert gas being sealed within the cylinder; whereby upon application of heat to the phosphor, light is emitted in proportion to the previous irradiation of the dosimeter.

14. The cylindrical container of claim 13 being a hollow glass needle.

15. The cylindrical container of claim 13 being a folded cylinder having an open end cylindrical recess coaxially positioned within the cylinder.

16. An improved thermoluminescent dosimeter comprised of a substrate, a film of thermoluminescent phosphor adsorbed on the substrate, a transparent envelope, the substrate sealed in an inert environment within the transparent envelope.

17. An improved thermoluminescent dosimeter comprised of an electrically conductive substrate, a colloidal film of deep electron trap thermoluminescent phosphor particles adsorbed on the substrate, a transparent envelope, the substrate sealed in an inert environment within the envelope, a plurality of electrical leads connected to the substrate and to the exterior of the sealed envelope.

References Cited in the file of this patent

UNITED STATES PATENTS

| | | |
|---|---|---|
| 2,616,051 | Daniels | Oct. 28, 1952 |
| 2,761,070 | Moos et al. | Aug. 28, 1956 |
| 2,775,710 | Ludeman | Dec. 25, 1956 |
| 2,953,684 | MacHutchin et al. | Sept. 20, 1960 |

FOREIGN PATENTS

| | | |
|---|---|---|
| 1,115,373 | Germany | Oct. 19, 1961 |